Patented Sept. 1, 1953

2,650,893

UNITED STATES PATENT OFFICE 2,650,893

WOOD PRESERVATION WITH DIMETHYL TETRACHLOROPHTHALATE

Harry G. Walker, Langhorne, Pa., assignor to The Pennsylvania Salt Manufacturing Company, Philadelphia, Pa., a corporation of Pennsylvania No Drawing. Application December 2, 1950, Serial No. 198,904

6 Claims. (Cl. 167—38.6)

This invention relates to the protection of wood and similar fibrous materials against the attack of termites by depositing in the wood small amounts of dimethyl tetrachlorophthalate.

The protection afforded to wood through impregnation of the wood by small amounts of dimethyl tetrachlorophthalate is surprising when it is considered that this compound when tested for its toxicity as an insecticide against conventional test insects such as house flies and confused flour beetles showed substantially no insecticidal properties. However, wood impregnated with dimethyl tetrachlorophthalate has shown excellent resistance to attack by termites; samples of wooden blocks impregnated for approximately ten minutes with 0.05% solutions of this material showing no attack by termites after a test period of over 1½ years. Besides giving excellent protection to wood against termite attack, the dimethyl tetrachlorophthalate is especially advantageous in that it is substantially insoluble in water and, thereafter, is highly resistant to leaching. Wood treated with this compound as a result maintains its resistance to termite attack even where used in contact with substantial amounts of water.

For economic reasons it is preferred to use water as the carrier in treating the wood with the dimethyl tetrachlorophthalate. However, since the dimethyl tetrachlorophthalate is substantially insoluble in water, in preparing impregnating solutions the dimethyl tetrachlorophthalate is first dissolved in an organic solvent and the resulting solution then added to the water carrier. In my preferred operation, the dimethyl tetrachlorophthalate is dissolved in small amounts of xylene or isopropyl alcohol and then emulsions of these solutions in water are prepared; emulsifying agents may be used if desired also wetting agents may be added. After the wood has been impregnated with the impregnating solution or emulsion, the wood is dried so as to drive off the water and organic solvent. The substantially insoluble dimethyl tetrachlorophthalate is left deposited within the individual fibers of the treated wood.

Due to the fact that difficulty may be encountered by those treating wood in making suitable water dispersions of the dimethyl tetrachlorophthalate, it is frequently desirable to have for commercial use an emulsifiable concentrate of the dimethyl tetrachlorophthalate which can be added to the water carrier and easily dispersed therethrough. Such an emulsifiable concentrate can be formed by preparing a solution of dimethyl tetrachlorophthalate in an organic solvent which also contains a small amount of an emulsifier for the solvent. An example of such an emulsifiable concentrate would be a solution of dimethyl tetrachlorophthalate in xylene, the xylene also having dissolved therein approximately 3 to 10 parts by weight of an emulsifier of the alkylated aryl polyether alcohol type, such as "Triton X-100" a product sold by Rohm and Haas Company.

Having thus described my invention, I claim:

1. A composition for treating wood to protect the wood against termite attack comprising dimethyl tetrachlorophthalate, an organic solvent for said dimethyl tetrachlorophthalate, and water, said water being present in amounts in excess of said dimethyl tetrachlorophthalate.

2. A composition for preparing aqueous impregnating dispersions of dimethyl tetrachlorophthalate for the treatment of fibers comprising an organic solvent for said dimethyl tetrachlorophthalate having dissolved therein dimethyl tetrachlorophthalate and an emulsifier for said organic solvent.

3. The method of protecting wood against termite attack comprising impregnating said wood with a solution of dimethyl tetrachlorophthalate.

4. The method of protecting wood against termite attack comprising impregnating said wood with a dispersion of dimethyl tetrachlorophthalate in a liquid carrier.

5. The method of protecting wood against termite attack comprising immersing said wood in an aqueous solution of dimethyl tetrachlorophthalate until at least the surface of said wood has become impregnated with said solution and thereafter drying said wood.

6. As a new article of manufacture wood impregnated with dimethyl tetrachlorophthalate.

HARRY G. WALKER.

References Cited in the file of this patent

UNITED STATES PATENTS

| Number | Name | Date |
|---|---|---|
| 2,062,403 | Dreyfus | Dec. 1, 1936 |
| 2,462,601 | Bohrer | Feb. 22, 1946 |